United States Patent
Ueno et al.

(10) Patent No.: US 6,216,120 B1
(45) Date of Patent: Apr. 10, 2001

(54) AGENT SYSTEM WHICH OPERATES ACCORDING TO A CHARACTERISTIC BEING SET THERETO

(75) Inventors: Tsuyoshi Ueno; Masato Ishikawa; Hideki Yasukawa, all of Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/039,568

(22) Filed: Mar. 16, 1998

(30) Foreign Application Priority Data

Jun. 23, 1997 (JP) .................................................. 9-165478

(51) Int. Cl.[7] .................................................... G06F 17/00
(52) U.S. Cl. .................................. 706/47; 706/46; 706/47
(58) Field of Search .................................. 706/47, 48, 46, 706/45, 50; 707/1

(56) References Cited

U.S. PATENT DOCUMENTS

| | | | |
|---|---|---|---|
| 4,654,798 | | 3/1987 | Taki et al. ................................. 704/7 |
| 4,829,423 | | 5/1989 | Tennant et al. .......................... 704/8 |
| 4,852,003 | * | 7/1989 | Zamora ................................... 707/18 |
| 5,136,523 | * | 8/1992 | Landers .................................. 706/50 |
| 5,193,144 | * | 3/1993 | Tsutsumi et al. ....................... 706/60 |
| 5,323,311 | * | 6/1994 | Fukao et al. ............................ 704/2 |
| 5,422,980 | * | 6/1995 | Kurosawa et al. ..................... 706/60 |
| 5,754,737 | * | 5/1998 | Gipson ................................... 706/11 |
| 5,915,253 | * | 6/1999 | Christiansen ......................... 707/103 |
| 5,926,621 | * | 7/1999 | Schwarz et al. ....................... 714/26 |
| 6,040,842 | * | 3/2000 | Wavish et al. ....................... 345/473 |
| 6,044,347 | * | 3/2000 | Abella et al. ......................... 704/272 |
| 6,070,149 | * | 5/2000 | Tavor et al. ............................ 705/13 |
| 6,092,059 | * | 7/2000 | Straforini et al. ..................... 706/14 |

FOREIGN PATENT DOCUMENTS

| | | |
|---|---|---|
| 561679 | 3/1993 | (JP) . |
| 668063 | 3/1994 | (JP) . |
| 7006142 | 1/1995 | (JP) . |
| 7261986 | 10/1995 | (JP) . |

OTHER PUBLICATIONS

Anick et al, "Integrating a dynamic lexicon with dynamic full text retrieval system," ACM SIGIR, pp. 136–145, 1993.*

Rau et al, "Creating segmented database from free text for text retrieval", ACM pp. 337–346, Jan. 1991.*

Atherton et al., "A probabilistic model for natural language understanding", ACM–SAC, pp. 586–592, Feb. 1993.*

Pttman, "Recognizing handwritten text", ACM pp. 271–275, Mar. 1991.*

Sheridan et al, "The script processing technique inmodeling/simulation and its role in the generation of animated computer graphics", Proc. 1986 winter simu. conf., pp. 810–826.*

(List continued on next page.)

Primary Examiner—Tarig R. Hafiz
Assistant Examiner—Anil Khatri
(74) Attorney, Agent, or Firm—Israel Gopstein (57) ABSTRACT

One of prepared types of agent characteristics types is set to an agent, and parameters used in agent operation are set for values associated with the set agent characteristic type, thereby causing the agent to operate according to the agent characteristic type. An agent script base contains a plurality of operation descriptions. In response to a command from the user, parameters used in the execution of the command are set for the above values. The parameters are preferably kept in a table. Then, one of the operation descriptions associated with the command is executed referring to the table. Setting a user's characteristic type causes the set agent characteristic type to be changed to one associated with the user's characteristic type.

2 Claims, 8 Drawing Sheets

OTHER PUBLICATIONS

Slocum et al, Transportability to other languages the natural langue processing project in the Al program at MCC, ACM Trans. of off. Inf. sys. vol. 3, No. 2, pp. 204–230, Apr. 1985.*

Choi et al, "Mulri agent learning approach to WWW information retrieval using neuarl network", IUI ACM, pp. 23–30, Aug. 1999.*

Saeki et al, "Software development process from natural Inaguge specification", ACM pp. 64–73, 1989.*

Kozierok et al, "A learning interaface agent for scheduling meeting", IUI ACM, pp. 81–88, Jul. 1992.*

Rodden et al, "Interatcing with an active integrated environment", ACM pp. 76–84, 1988.*

* cited by examiner

(3A)
| WHO | ACTION | WHAT | HOW | WHERE | WHEN | WHY |
|---|---|---|---|---|---|---|
| I | | | | | | |
| YOU | | | | | | |
| HE | | | | | | |
| · | | | | | | |
| · | | | | | | |

(3B)
| I | ACTION | WHAT | HOW | WHERE | WHEN | WHY |
|---|---|---|---|---|---|---|
| | AM | | | | | |
| | WAS | | | | | |
| | COME | | | | | |
| | · | | | | | |
| | · | | | | | |

(3C)
| I | AM | WHAT | HOW | WHERE | WHEN | WHY |
|---|---|---|---|---|---|---|
| | | A | | | | |
| | | B | | | | |
| | | · | | | | |
| | | · | | | | |

ENGLISH : [WHO, ACTION, WHAT, HOW, WHERE, WHEN, WHY] ~300

JAPANESE : [なぜ, いつ, どこ, だれ, なに, どう, する ]
(NAZE) (ITSU) (DOKO) (DARE) (NANI) (DOH) (SURU) ~310

FIG. 12

| PARAMETER NAME | VALUE | DESCRIPTION |
|---|---|---|
| active | 100 | CPU USE RATE(%) |
| area | JAPAN | SEARCHING AREA |
| logical | 100 | LOGICAL DEGREE ON DECISION(%) |
| memory | 100 | MEMORY USE RATE(%) |
| ⋮ | ⋮ | ⋮ |

AGENT SYSTEM WHICH OPERATES ACCORDING TO A CHARACTERISTIC BEING SET THERETO

BACKGROUND OF THE INVENTION

1. Field of the Invention

The present invention relates to an agent (or a software module with a knowledge or rule base and a capability of operating to meet a user's request on the basis of a decision which has been made by itself on how to meet the request) and, more particularly, to an agent-user interface.

2. Description of the Prior Art

User interfaces with agents and applications are generally classified into physical extrovert interfaces such as GUIs (or graphical user interfaces) and logical internal interfaces such as APIs (or application programming interfaces).

There are some examples for internal interfaces each capable of adapting the agent operation to the user by using the agent internal status, reference data used by the agent, etc.

For example, Japanese patent unexamined publication No. Hei6-68063 (1994) discloses a virtual life system which simulates a living thing by using knowledge stored in a knowledge base and internal and extrovert condition information of and environment information stored in a condition information storage means. However, this system does not have a capability of changing the operation thereof by using parameters associated with characteristics of the system itself or characteristics of the user.

Japanese patent unexamined publication No. Hei7-6142 (1995) discloses a multiagent cooperation system in which objective data of each user and data dependent on preference of the user are stored in a user defined data storage for the user, and either passed to an agent group associated with the user in response to a request from the agent group or used for a conversion of a request from the user which is to be passed to an agent of the agent group in response to a request from the agent. However, the data stored in the user defined data storage only include data associated with neither characteristics of the system itself nor characteristics of the user, which prevents agents from having characteristics and operation of the agents from being adapted to characteristics of the agents or characteristics of the user.

SUMMARY OF THE INVENTION

It is therefore an object of the invention to provide an agent system whose parameters used in operation can be set for values associated with type of agent characteristics type set to the agent system.

It is another object of the invention to provide an agent capable of adapting the agent characteristic type to a user's characteristic type, thereby adapting the operation of the agent to the user's characteristics.

It is another object of the invention to provide an agent capable of communicating a parameter, an agent characteristic type, etc. with another agent and, if having received such data, setting the data as own data.

According to a first illustrative embodiment of the invention, the user can set a characteristic (an agent characteristic type) to an agent in a computer-based system thereby causing the agent to operate according to the type of agent characteristic. This is achieved by setting parameters used in operation of the agent for values associated with the type of agent characteristic type. A menu language input program permits the user to input a message such that the message is acceptable to the agent.

To implement various features of the invention, there may be provided a software module which operates to meet a message from a user; and which comprises: means for permitting the user to input the message such that the message is acceptable in the module; means for converting the message into an input script in a predetermined form; a plurality of operation descriptions, each comprising a conditional statement concerning the input script and at least one instruction which may be written by using at least one parameter and functions in various ways associated with possible values of each of the parameter(s); setting means for setting parameters which are to be used by one of the operation descriptions whose conditional statement is satisfied by the input script for values associated with a selected one of characteristic types prepared for the module; means activated after said setting for executing the at least one instruction of one of the operation descriptions whose conditional statement is satisfied by the input script; sending means responsive to a passed data for sending the passed data to another agent; and receiving means responsive to a received data from another agent for passing the received data to the means for executing the at least one instruction.

In such an arrangement, the plurality of operation descriptions include: an operation description which is used for a parameter sending command and which passes an ID and a value of a parameter specified by the user and a destination agent address to the sending means; and an operation description which is used for a parameter receiving command and which sets a parameter of an ID contained in the received data for a value contained in the received data.

According to a second illustrative embodiment of the invention, there may be provided a software module which operates to meet a message from a user; and which comprises: means for permitting the user to input the message such that the message is acceptable in the module; means for converting the message into an input script in a predetermined form; a plurality of operation descriptions, each comprising a conditional statement concerning the input script and at least one instruction which may be written by using at least one parameter and functions in various ways associated with possible values of each of the parameter(s); setting means for setting parameters which are to be used by one of the operation descriptions whose conditional statement is satisfied by the input script for values associated with a selected one of characteristic types prepared for the module; means activated after said setting for executing the at least one instruction of one of the operation descriptions whose conditional statement is satisfied by the input script; sending means responsive to a passed data for sending the passed data to another agent; and receiving means responsive to a received data from another agent for passing the received data to the means for executing the at least one instruction.

In such an arrangement, the plurality of operation descriptions include: an operation description which is used for a characteristic script sending command and which passes a characteristic script to the sending means; and an operation description which is used for a characteristic script receiving command and which sets, as the selected characteristic type, a characteristic script contained in the received data.

BRIEF DESCRIPTION OF THE DRAWING

Further objects and advantages of the present invention will be apparent from the following description of the preferred embodiments of the invention as illustrated in the accompanying drawing, in which.

Throughout the drawing, the same elements when shown in more than one figure are designated by the same reference numerals.

DETAILED DESCRIPTION OF THE PREFERRED EMBODIMENTS

Embodiment 1

Figure 1:
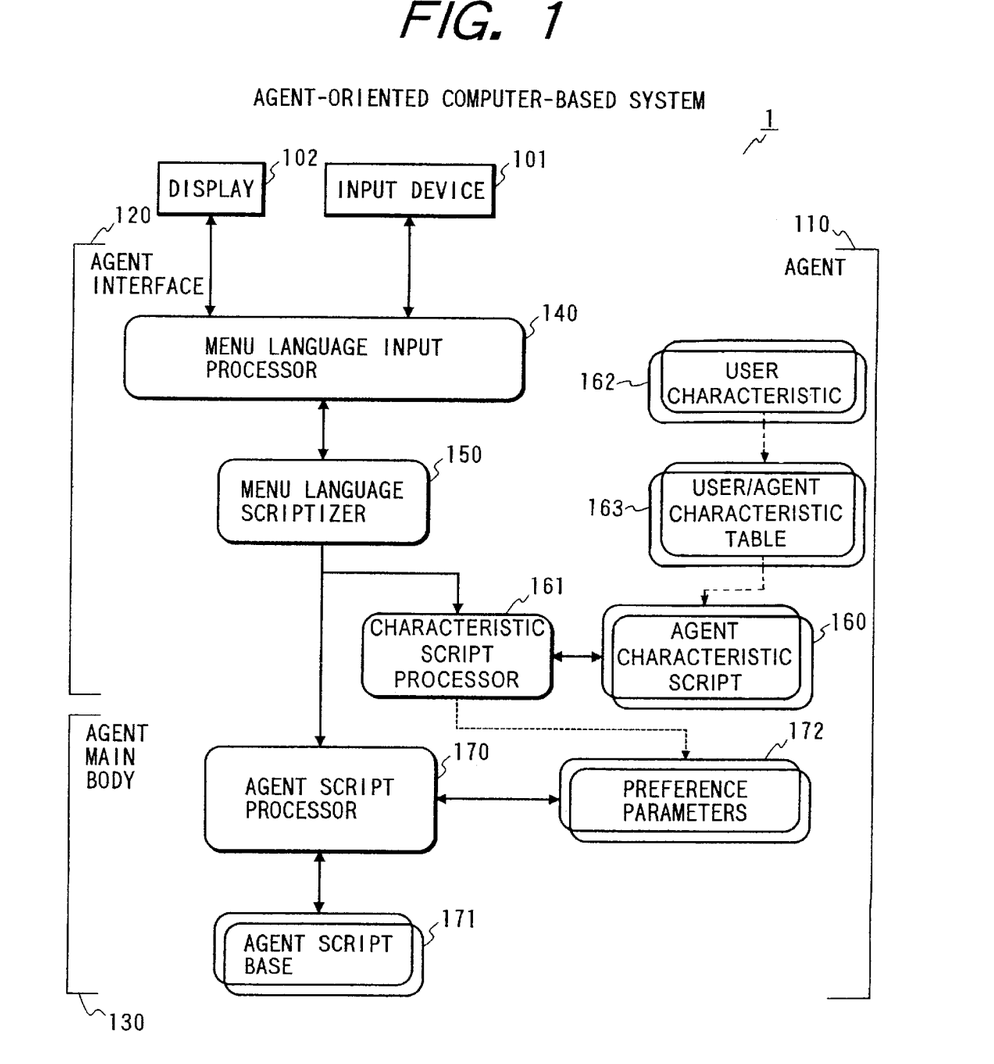
FIG. 1 is a schematic block diagram showing an exemplary computer-based system in which an illustrative embodiment of an agent system in accordance with the principles of the invention is running in a usual operation mode.

FIG. 1 is a schematic block diagram showing an exemplary agent-oriented computer-based system in which an illustrative embodiment of an agent system in accordance with the principles of the invention is running in a usual operation mode, wherein rectangular blocks indicate elements comprising hardware, single-line corner-rounded blocks indicate software or programs, and double-line corner-rounded blocks indicate data sets. In FIG. 1, the computer-based system 1 may be any computer-based system comprising a not shown CPU (central processing unit), a not shown main memory or RAM (random access memory), a not shown auxiliary memory such as a hard disc, and input and output devices including an input device 101 and a display 102. In FIG. 1, an agent system 110 is shown as being executed in the computer-based system 1.

Figure 2:
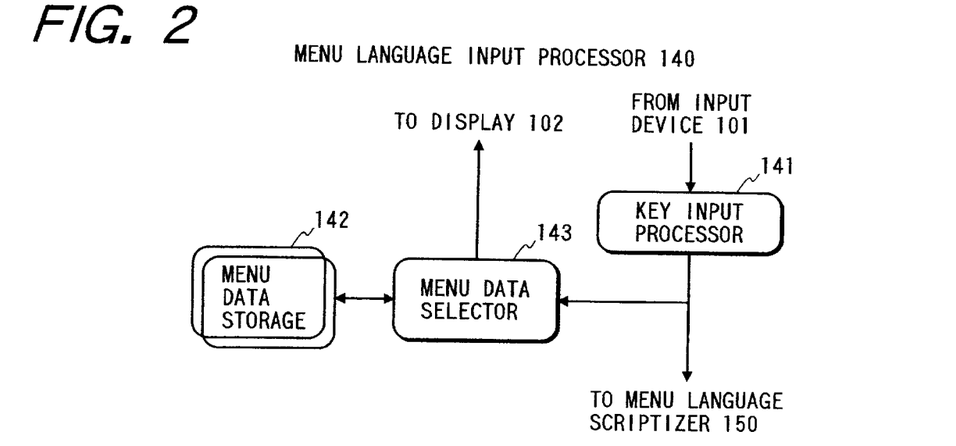
FIG. 2 is a schematic block diagram showing an illustrative embodiment of the menu language input processor of FIG. 1.

The agent 110 comprises an agent interface 120 and an agent main body 130. The agent interface 120 permits the user to pass a command or a message to the agent main body 130 as a corresponding script which is independent of the kind of the entered command or message language and has the form acceptable to the agent main body 130. The agent interface 120 comprises a menu language input processor 140 for letting the user enter the command or message by selecting one of choices of each of menu items given one after another and a menu language scriptizer 150 for converting the entered command or message into the corresponding script. FIG. 2 is a block diagram showing an illustrative embodiment of the menu language input processor 140. The processor 140 comprises a key input processor 141 for receiving input data from the user and passing the input data to subsequent stages, a menu data storage 142 which defines possible choices for each of predetermined menu items constituting available menu language expressions, and a menu data selector 143 for assisting the user to input a command or message in the menu language by selecting and displaying relevant choices (or options) for each of the predetermined menu items from the possible choices in the menu data storage 142.

The agent main body 130 comprises an agent script processor 170, an agent script base 171 for storing, in the form of script, knowledge and actions necessary for the operation of the agent script processor 170 and preference parameters 162 which permit the agent main body 130 to have an individuality.

According to the principles of the invention, the agent interface 120 further comprises agent characteristic scripts 160 for each associating an agent characteristic with preference parameter values depending on each input command and a character script processor 161 for setting the preference parameters according to the specified agent characteristic script 160 in response to each input command, thereby permitting the user to set the preference parameter according to a user specified or defined agent characteristic script. The agent interface 120 further comprises a user characteristic register 162 for storing a user characteristic and a user/agent characteristic table 163 for associating a user characteristic with an appropriate agent characteristic, thereby adapting the agent characteristic script 160 to the user's characteristic, i.e., adapting preference parameters and accordingly the operation of the agent main body 130 to the user or a user's characteristic.

The agent script processor 170 receives the command or message in the form of script and execute a script stored in the agent script base 171 and associated with the received command or message Operation of the agent interface 120

Figure 3:
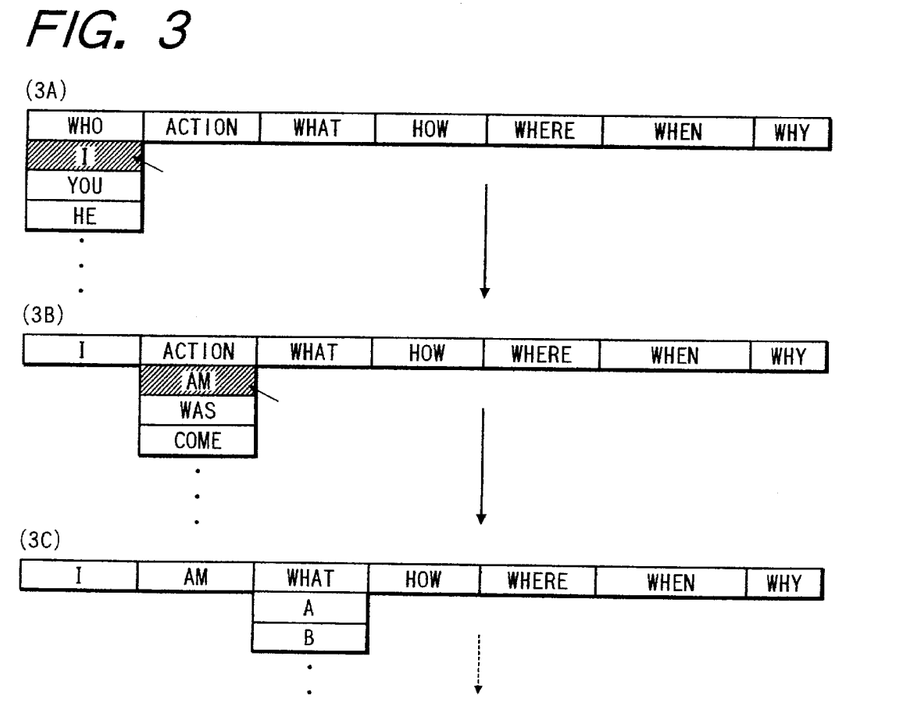
FIG. 3 is a diagram illustrating how a command or a message is input in accordance with the menu language input method of the invention.

FIG. 3 is a diagram illustrating how a command or a message is input in accordance with the menu language input method of the invention. In FIG. 3, menu items comprises ACTION plus four W's one H (i.e., WHO, ACTION, WHAT, HOW, WHERE, WHEN, and WHY). Using these menu items enables the user to input a command or message in a natural language like manner. As menu items, any suitable element may be used including a subject, a predicate, an object, a complement, an adverb, an adjective, etc. It is noted that an option of each menu item may consist of a plurality of words.

In order to facilitate the understanding, it is assumed that the menu data storage 142 stores, for example, the following menu data:

```
<html>
<FORM ACTION="http://cgibin/connect_agent8000" method="POST">
<H1>Orders:
<input TYPE="submit" VALUE="DO!" NAME="place_agent">
</H1>
```

-continued

```
<select name="who">
    <option selected> who
    <option> I
    <option> WHO
</select>
<select name="action">
    <option selected> action
    <option>am
<!--    <option> is      -->
<!--    <option> are     -->
    <option> was
<!--    <option> were    -->
    <option> search
    <option> come
</select>
<select name="what">
    <option selected> what
    <option> A
    <option> B
    <option> WHAT
</select>
<select name="how">
    <option selected> how
</select>
<select name="where">
    <option selected> where
</select>
<select name="when">
    <option selected> when
</select>
<select name="why">
    <option selected> why
</select>
</html>
```

The menu data is written in the HTML (hyper text make-up language) format. In the above menu data, a part beginning with "<select>" and ending with "</select>" is a description for one menu item. There are three options "who", "I" and "WHO" for the first menu item "WHO". An expression "<option selected>" indicates a selection default.

Figure 4:
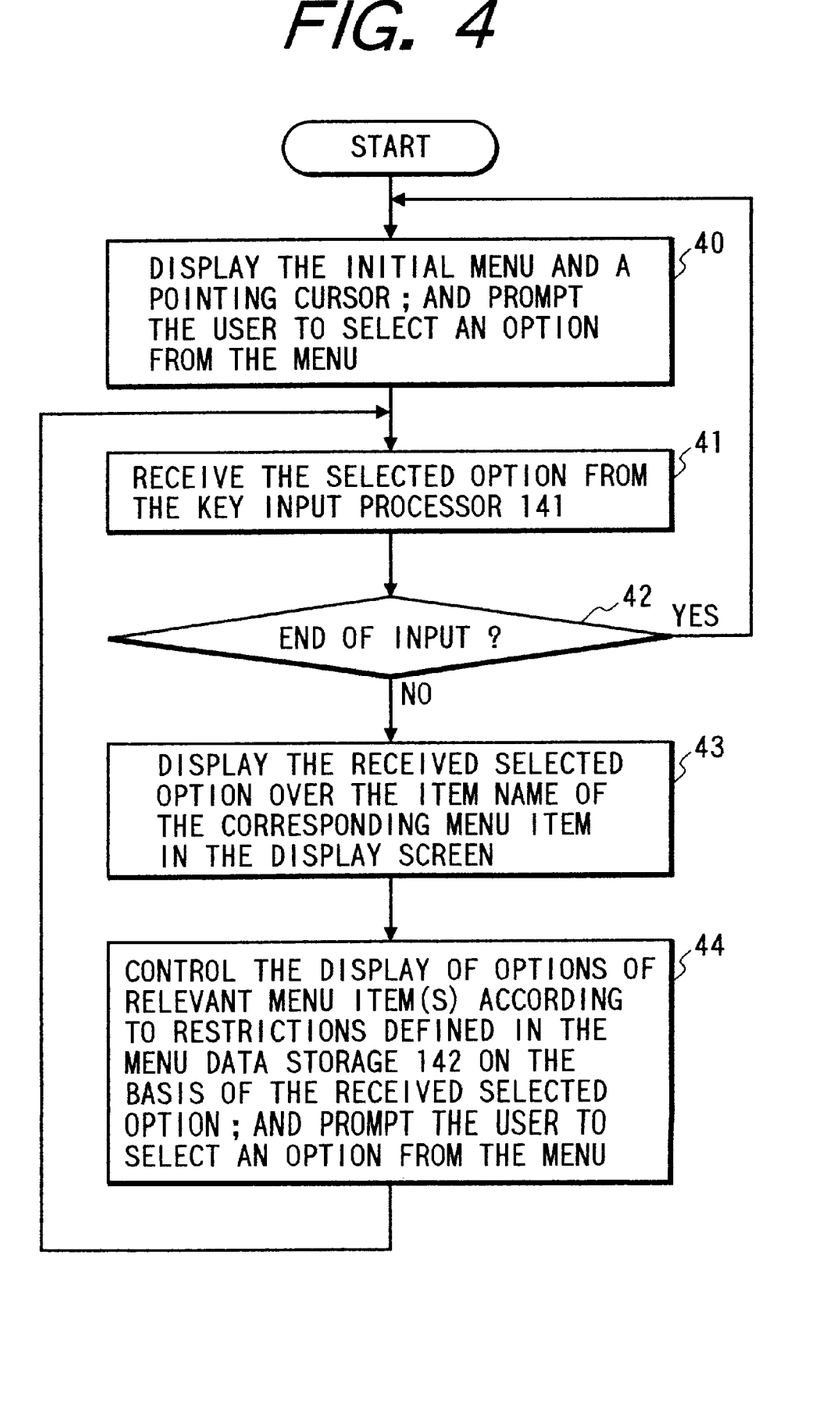
FIG. 4 is a flow chart showing an exemplary operation of the menu data selector 143 in accordance with the principles of the invention.

FIG. 4 is a flow chart showing an exemplary operation of the menu data selector 143 in accordance with the principles of the invention. If the agent system 110 is activated, the menu data selector 143 first displays the initial menu and a pointing cursor on the display 102 screen as shown in FIG. 3A and prompts the user to select one of the options listed for a menu item of the menu in step 40. In FIG. 3A, options "I", "YOU", "HE" and so on are displayed for the menu item "WHO".

It is assumed here that the user selects an option "I" from the menu item "WHO" in the displayed menu. Then the selector 143 receives the selected option (i.e., "I" in this specific example) in the form of, e.g., "who=I" from the key input processor 141 in step 41. In step 42, the selector 143 makes a test to see if the received data from the key input processor 141 indicates the end of the current command or message. If not, then the selector 143 displays the received selected option ("I" in this example) over the item name of the corresponding menu item of the menu in step 43. In step 44, the selector 143 controls the display of options for the next menu item in the menu according to restrictions defined in the menu data storage 142 on the basis of the received selected option. Specifically, in the above listed menu data, options of the second menu item "ACTION" which are not to be selected are excepted and rewritten as comments, which are shown as expressions parenthesized between "<--" and "-->". In the above menu data, options "is", "are" and "were" have been excepted as comments. In this way, these options will be excepted from the options of the menu item "ACTION" in the input menu to be displayed next.

Thus displayed menu is shown in FIG. 3B. In FIG. 3B, the first item name has been replaced by "I" and options "AM", "WAS", "COME" and so on are displayed for the menu item "ACTION". Then, the selector 143 again prompts the user to select one of the options listed in the menu. After step 44, the selector 143 returns to step 41. Repeating these steps till the command or message input is completed causes the menu items to be converted into a command or message step by step as shown in FIGS. 3A, 3B, 3C and so on. Thus entered command or message is passed to the menu language scriptizer 150.

Assuming that the user has selected "I", "am" and "A" for menu items WHO, ACTION and WHAT, respectively, the menu language scriptizer 140 will receive "who=I", "action=am" and "what=A" to form an original sentence as:

"I, am, A, how, where, when, why".

In this original sentence, elements "how", "where", "when" and "why" shows selection defaults, i.e., shows that the user has selected no option for the respective menu items. The menu language scriptizer 140 converts the original sentence into a script, which is, hereinafter, expressed as:

"[I, am, A, how, where, when, why]"

Operation of the agent main body 130

Figure 5:
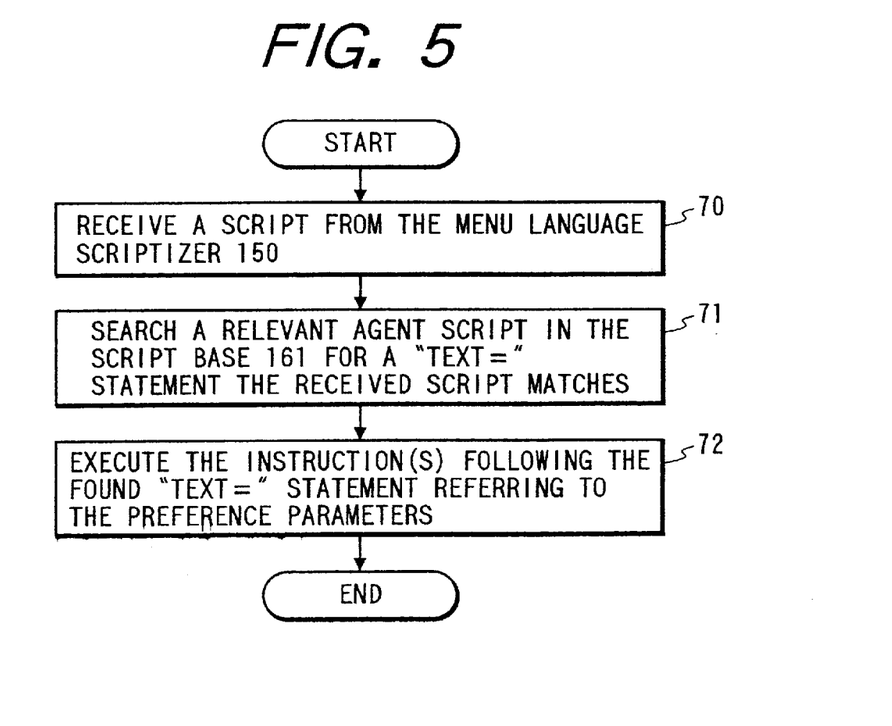
FIG. 5 is a flow chart showing the operation of the agent script processor 170 of FIG. 1.

FIG. 5 is a flow chart showing the operation of the agent script processor 170 for executing an agent script stored in the agent script base 171 and associated with the input script referring to the preference parameters 172 according to the principles of the invention.

In order to facilitate the understanding, it is assumed that the agent script base 171 includes, for example, the following script:

```
agentscript>
    id>10001<id
    image>
        image 1:angry.gif
        image 2:smile.gif
    <image
    knowledge>
    <knowledge
    rule>
        iput(text)
        text= "[I, am, ?, how, where, when, why]" ->
            display( "What can I do for you!" ),
            learn([visitor,?])
        text= "[I, search for, ?, how, where, when, why]" ->
            display( "Searching for?" )
            learn([searching for, ?])
            search_for(?)
        text= "[WHO, came, what, how, where, when, why]" ->
            remember([visitor, ?]),
            display( "? has come." )
        text= "[who, search, WHAT, how, where, when, why]" ->
            remember( [searching for, ?]),
            display( "I am searching for ?" )
        text=? ->
            display( "Sorry, but I can't understand." )
    <rule
<agentscript
```

This script describes an operation of searching for a person. The operation of this agent is described in the parenthesized section between rule> and <rule. The other sections are for the ID, the image description and the knowledge description of the agent, cited from top to bottom.

The notation "input(text)" indicates the input of "text". The expression of the form "text="[ ... ]"->" means that if the "text" matches "[ ... ]", then the portion following "—>" is executed. A single letter "?" is used as a wild card. For this reason, an inverted question mark "¿" is added before a question mark "?" in order to use a question mark as an ordinary letter. The last statement "text=-> . . . " means that if the "text" matches none of the above conditions, the portion following "—>" is to be executed.

Returning now to FIG. 5, the agent script processor 170 first receives a script from the menu language scriptizer 150 in step 70. If the agent main body 130 or the agent script processor 170 receives the script "[I, am, A, how, where, when, why]", then it follows that:

text="[I, am, A, how, where, when, why]".

The agent script processor 170 searches a relevant agent script stored in the agent script base 171 for a "text=" statement the received script matches in step 71. In the above listed agent script, the first "text=" statement matches the received script because the wild card "?" matches anything. Accordingly, in step 72, the agent script processor 170 executes the instruction(s) following the found "text=" statement, that is, displays "What can I do for you?" according to the instruction "display( "What can I do for your¿?" )" and memorizes the fact "the visitor is A" according to the instruction "learn([visitor, ?])". This fact is either added to the knowledge description as a file or stored in the memory.

It should be noted that the execution of the instruction(s) in step 72 is achieved referring to the preference parameters 172 which have been set, in response to each command input, by the characteristic script processor 161 executing the above mentioned characteristic script 160 as detailed in the following.

Setting the preference parameters

Figure 6:
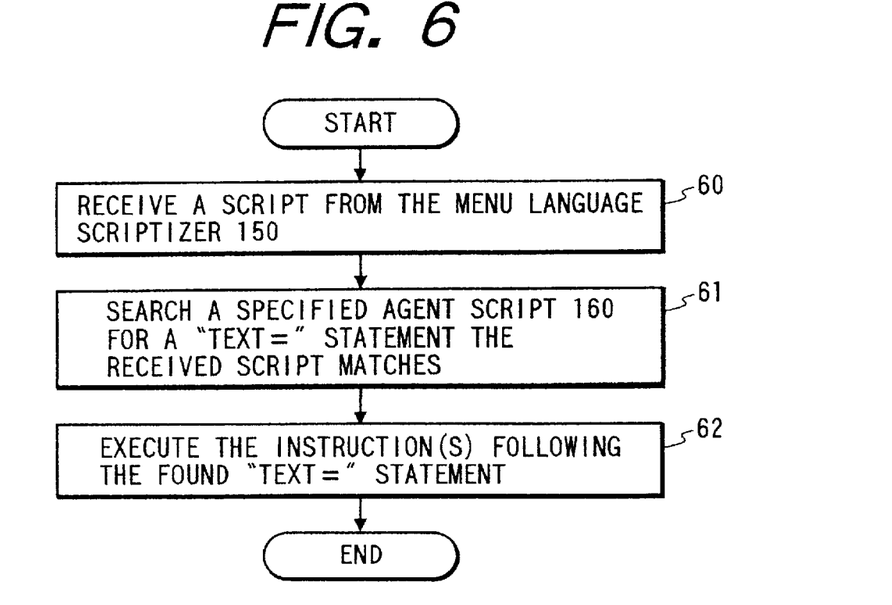
FIG. 6 is a flow chart showing the operation executed by the above mentioned CPU (not shown) under the control of characteristic script processor 161 according to the principles of the invention.

FIG. 6 is a flow chart showing the operation executed by the above mentioned CPU (not shown) under the control of characteristic script processor 161 according to the principles of the invention. On completing the operation of the menu scriptizer 150, the not-shown CPU enters the operation of characteristic script processor 161, which is identical to the agent script processor 170 except that the processor 161 uses the agent characteristic script 160 instead of the agent script base 171 and rewrites but does not refer to the preference parameters 172. In FIG. 6, the CPU again receives a script from the menu language scriptizer 150 in step 60. In order to facilitate the understanding, an example of agent characteristic scripts 160, i.e., an agent characteristic script of a deliberate(extrovert) type will be shown in the following:

--- characteristic script>
    id>10001<id
    type>
        deliberate(extrovert)
    <type
    rule>
        /*Making much of a fact*/
        use(fact-only)
        input(text)
        /*Making operation active*/
        text= "[who, ACTION, what, how, where, when, why]" ->
            add(active, 100%)
        /*Gathering as much information as possible*/
        text= "[who, search, what, how, where, when, why]" ->
            add(memory, 100%)
        /*Decisions are made ligically*/
        text= "[WHO,ACTION,WHAT,HOW,WHERE,WHEN,WHY]"->
            add(logical, 100%)
    <rule
<characteristic script

---

In this characteristic script, the section placed within "type>" and "<type" indicates the characteristic type of the characteristic script. In this example, the type of characteristic is a deliberate(extrovert) type. In this illustrative embodiment, each character type is a combination of two factors. One factor is classified into "deliberate", "intuitive", "sensitive" and "emotional", and the other factor is classified into "extrovert" and "introvert". Consequently, 4×8 basic characteristic types are possible.

The section placed within "rule>" and "<rule" contains conditional and unconditional operation descriptions. Each of the conditional operation descriptions comprises a conditional statement which defines a condition the input script from the menu language scriptizer 150 has to satisfy and one or more instruction(s) to be executed when the condition is satisfied. Unconditional operation descriptions include no conditional statements. Executing such an instruction(s) causes the preference parameters 172 to be set according to the characteristic defined in the agent characteristic script 160.

Specifically, "text" denotes the input script from the menu language scriptizer 150. The first operation description "use (fact-only)" is unconditional and accordingly executed at a time of, e.g., the invocation of the agent system 110 even if there is no input. Executing the instruction "use(fact-only)" causes the preference parameters to be so set that the agent script processor 170 executes each of the input scripts on the basis of data which are determined to be correct or exact 100%. This determination is achieved by referring to correctness indices each associated with the data source of the data in question.

In order for the condition to be satisfied in a conditional statement "text=" . . . "—>", a specific reference value such as "search" requires the same value for the corresponding position (or item) of the input script, a reference value which is the menu item name in the lower case, e.g., "what", indicates an input (or selection) default for the menu item, and a higher-case item name, e.g., ACTION, permits any value if any value has been input in the position of the input script.

Accordingly, the first conditional operation description is effective if the input script has had any value indicative of an action, i.e. a verb set for the ACTION item, which causes the instruction "add(active, 100%)" to be executed. This means setting a parameter "active" among the preference parameters for 100%.

The type of character of the agent system 110 may be set or selected automatically or by the user. Setting or selecting any agent characteristic type enables the parameters to be set without taking time to set the parameters. In order to enable the user to select one of predetermined types of characteristic, the agent script base 171 contains an operation description to select one of predetermined characteristic types which is specified by a command from the user.

If, for example, the deliberate(extrovert) type is set to the agent 110 and an information search command is given to the agent 110, then the agent 110 will gather only information based on facts and make the data processing based on theoretical process rather than statistical process, exhibiting a deliberate aspect. Also, exhibiting an extrovert aspect, the agent 110 will search the widest possible range for information by increasing communications with other agents. In this sense, the deliberate(extrovert) type may be said to be a type highly effective to a case in which the user expects the agent 110 to make every action thereof exact and active ("active" in this case means a lot of communications with other agents).

Figure 12:
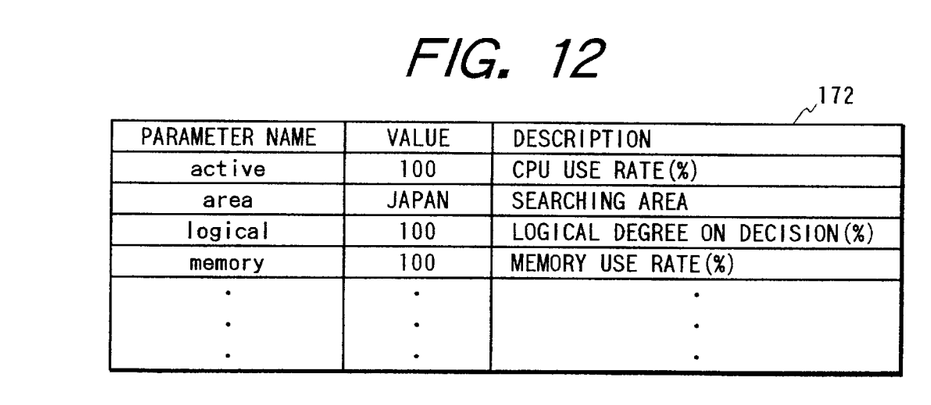
FIG. 12 is a diagram showing an illustrative embodiment of preference parameters of FIG. 1.

Returning now to FIG. 6, if the characteristic script processor 161 receives an input script "[who, search, what, how, where, when, why]" in step 60, then in step 61 the processor 161 scans the section placed within "rule>" and "<rule" for "text=" statements the received input script matches. In case of the above characteristic script, the input script matches "text="[who, ACTION, what, how, where, when, why]"->", "text="[who, search, what, how, where, when, why]"->" and "text="[WHO, ACTION, WHAT, HOW, WERE, WHEN, WHY]"->". Accordingly, the processor 161 executes the instruction(s) following the found "text=" statement(s) in step 62, that is, executes "add(active, 100%)", "add(memory, 100%)" and "add(logical, 100%)". Through this operation, the characteristic script processor 161 sets preference parameters "active", "memory" and "logical" for 100% as shown in FIG. 12, which means "Making the use rate the maximum", "Using the maximum possible memory areas of a primary memory and a hard disc" and "all decisions are made logically", respectively. (As for variations of decision, decisions may be made by any suitable means such as a neural network, statistical indices, etc. instead of logical decision.) In FIG. 12, each of the parameter records comprises the name, the value and description of the perimeter.

As described above, the above mentioned CPU (not shown) begins the operation of the agent script processor 170 after completing the operation of the characteristic script processor 161. That is, under the control of the agent script processor 170, the not-shown CPU executes an operation description in an agent script stored in the agent script base 171, which description is associated with the input script, referring to the preference parameters 172. In this example, the not-shown CPU executes an operation description for a command "search" with the CPU use rate the maximum on the basis of logical decisions by using the maximum possible memory areas of a primary memory and a hard disc.

For one "search" command, there may be a plurality of corresponding operation descriptions in the agent script base 171. In such a case, an operation description best suited for the specified agent character script can be selected from the candidate descriptions referring to the preference parameters 172.

From the above description, it has been understood how the parameters 172 are set by means of an agent characteristic script 160. Also, it is seen that different values of a parameter (i.e., different agent scripts) can cause the agent script processor 170 to use or execute different operation descriptions for the same command or input script.

Here, we discuss how different agent scripts or parameter values can cause an operation description in a agent script to change the way of operation of the agent in the following.

It is assumed that the agent script base 171 stores the following agent script:

```
agentscript>
     id>10003<id
     image>
     <image
     knowledge>
     <knowledge
     rule>
          input(text)
          text= "[who, search, tv, how, where, when, why]" -->
               searching_policy(Policy)
               area(Area)
               search(tv, Policy, Area)
          text=!-->
               display( "Sorry, but I can't understand" )
     <rule
<agentscript
```

In this script, the instruction search(tv, Policy, Area) is an instruction to gather information on TV in the area of Area by using a searching method of Policy. A comparison is made for the cases of the following two different agent characteristic scripts which contain instructions to set parameters concerning the above listed agent script for a search command:

```
characteristic script
     id>10001<id
     type>
          deliberate(extrovert)
     <type
     rule>
          input(text)
          .
          .
          .
          /*For information gathering*/
          text= "[who, search, what, how, where, when, why]" ->
               add(searching_policy, all)     /*from deliberate*/
               add(area, all)                  /*from extrovert*/
          <rule
          .
          .
          .
     <rule
<characteristic script
     characteristic script
     id>10002<id
     type>
          intuitive(introvert)
     <type
     rule>
          input(text)
          /*For information gathering*/
          text= "[who, search, what, how, where, when, why]" ->
               add(searching_policy, sampling) /*from intuitive */
               add(area, Japan)                /*from introvert */
          .
          .
          .
     <rule
<characteristic script
```

If the first agent characteristic script with an ID of 10001, which is of the deliberate(extrovert) type, is specified or selected as an active one, parameters Policy and Area are set for "all" prior to the execution of the instruction "search". Then the instruction "search" is executed with Policy as "all" and Area as "all". Policy="all" means that the information gathering is achieved by fully using all possible means—e.g., asking search server(s) for searching, referring to other agent(s), contributing to bulletin board(s) to ask for furnishing information, etc. Area="all" means that the information gathering is achieved in the world wide range.

On the other hand, if the second agent characteristic script with an ID of 10002, which is of the intuitive(introvert) type, is specified as an active one, then parameters Policy and Area are set for "sampling" and "Japan", respectively, prior to the execution of the instruction "search". Then the instruction "search" is executed with Policy as "sampling" and Area as "Japan". This means that the information gathering is achieved by using a suitable one of possible means, limiting the searching area to within Japan.

In this way, selecting different agent characteristic scripts 160 enables a single command to function in different ways.

Though only one agent script with an ID of 10003 has been used in the above description, even if there are many agent scripts using the same preference parameter(s), setting the preference parameter(s) by using different characteristic scripts advantageously enables the many agent scripts to operate in different ways without changing parameter(s) of each agent script.

Adapting the agent characteristic to the user character

Figure 7:
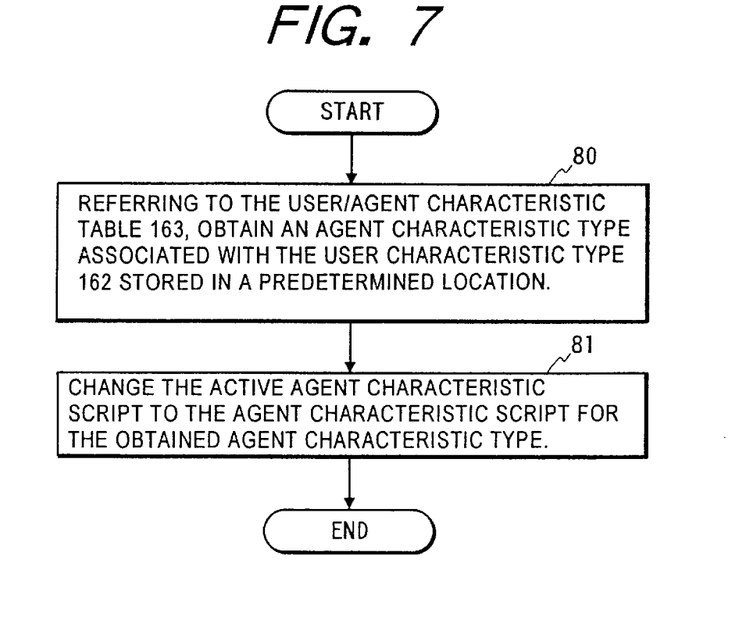
FIG. 7 is a flow chart showing an operation of changing the active agent characteristic script in accordance with the principles of the invention.

FIG. 7 is a flow chart showing an operation of changing the active agent characteristic script in accordance with the principles of the invention. The operation of FIG. 7 is started when a user characteristic type 162 has been set or stored in a predetermined location (not shown). In step 80, the not-shown CPU refers to the user/agent characteristic table 163 and obtains an agent characteristic type associated with the user characteristic type 162 stored in the predetermined location. Then, in step 81 the operation is completed by changing the active agent character script to the agent character script for the agent character type obtained in step 80.

Figure 8:
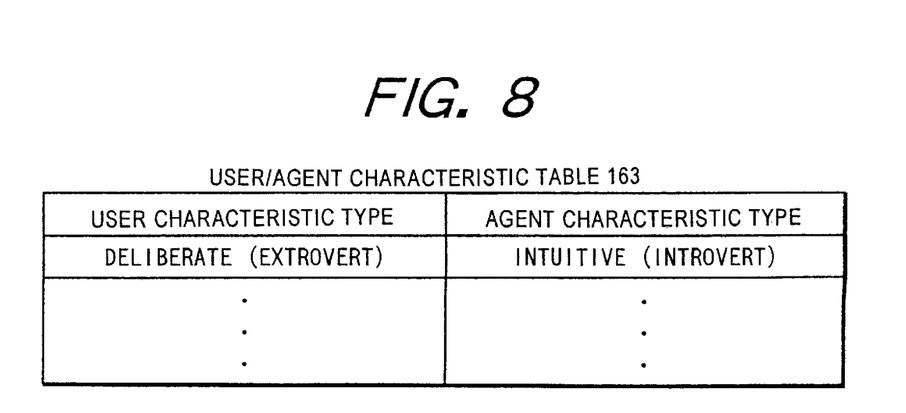
FIG. 8 is a diagram showing a part of an exemplary user/agent characteristic table 163 in accordance with the invention.

FIG. 8 is a diagram showing a part of an exemplary user/agent characteristic table 163 in accordance with the invention. In this example, a user characteristic type "deliberate(extrovert)" is associated with an agent characteristic type "intuitive(introvert)". In this case, the adaptation of the agent (or the preference parameters or the agent characteristic) is so achieved as to compensate the user's characteristic (deliberate(extrovert)) for lacking characteristic factors, i.e., "intuitive(introvert)". Alternatively, the adaptation of the agent may be such that the user characteristic and the agent characteristic coincide with each other.

The way of setting the user characteristic type 162 will be discussed in the following.

In order to enable the user to set the user characteristic type 162, the agent script base 171 may include a script for a command to set the user characteristic type 162. If the user enter the command, e.g., "(who, learn, characteristic, deliberate(extrovert), where, when, why)", then the menu language scriptizer 150 provides the command in the form of an input script "[who, learn, characteristic, deliberate (extrovert), where, when, why]". After completing the execution of the characteristic processor 161 (no instruction is executed actually in this case), the not-shown CPU starts the execution of agent script processor 170 as shown in FIG. 5. Through this execution, a user characteristic of the deliberate(extrovert) type is set.

The judgment of the user characteristic type may be made by any suitable means other than the user input of setting command.

Information on the user's characteristic may be obtained through a questionnaire, the result of which is used for the judgment.

User's input data which is relevant to the judgment of the user characteristic type may be accumulated for a period of time longer than a certain period. The accumulated input data may be utilized for the judgment. If, for example, the user rarely communicates with others or agents, then he or she may be judged to be extroversive. If expressions like "exactly" are frequently used, he or she may be judged to be deliberate. In this way, his or her characteristic type may be automatically set for the deliberate(extrovert) type.

Alternatively, the user's current emotion may be judged by his or her way of inputting. The operation of the agent may be adapted on the basis of the result of the judgment. If, for example, intervals between inputs are very short and input mistakes are frequently made, then he or she is judged to be hasty. Based on the judgment, wrong input data may be automatically collected by using an input data history.

The computer-based system 1 may be provided with a peripheral device for gathering information on user's expression such as a video interface and a video camera. The gathered information may be utilized for the judgment of user's current emotion.

Embodiment II

Figure 9:
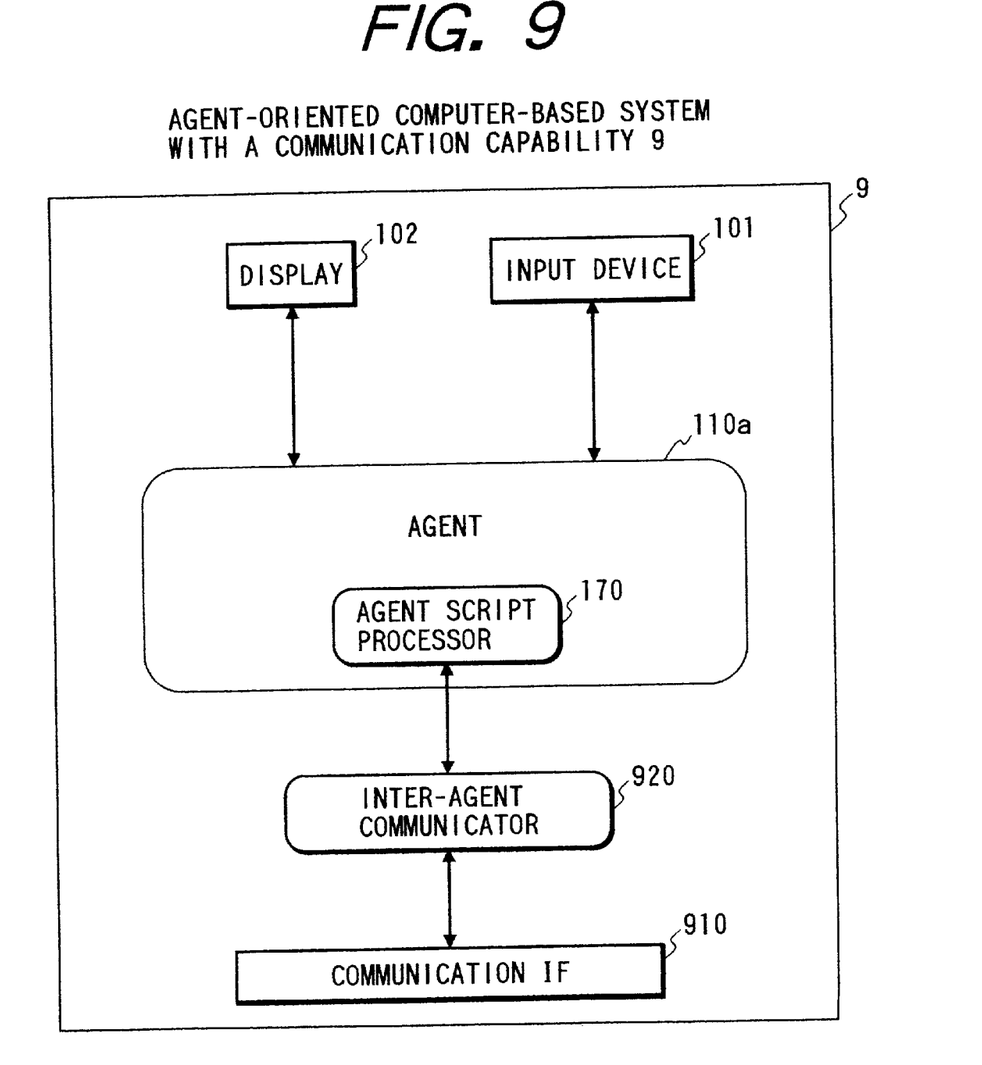
FIG. 9 is a schematic block diagram showing an illustrative embodiment of a agent-oriented computer-based system with a communication capability in accordance with the principles of the invention.

FIG. 9 is a schematic block diagram showing an illustrative embodiment of a agent-oriented computer-based system with a communication capability in accordance with the principles of the invention. In FIG. 9, the computer-based system 9 comprises the input device 101, the display 102, an agent 110a, a communication interface (IF) 910 for sending and receiving data to and from other computer system respectively, and an inter-agent communicator 920 for transferring data between the agent script processor 170 and the communication IF 910. The agent 110a is identical to the agent 110 except that the agent script base (not shown) of the agent 110a has further contains an operation description for a command to send a specified preference parameter to a specified destination or agent 110a in a different like system 9.

In order to send a parameter to other agent 110a, the user has only to enter a command "(who, send, active, how, a destination ID or address, when, why)". Then the agent script processor 170 receives an input script "[who, send, active, how, Destination ID or address, when, why]" and thereafter operates as shown in FIG. 5. By doing this, an operation description which is stored in the script base (not shown) and associated with the input script is executed. This causes the name and the value of preference parameter "active" to be sent to a like agent 110a of the specified destination ID or address through the inter-agent communicator 920 and the communication IF 910.

The destination ID or address may be an ID or address of a destination computer if there is only one agent in a system 9. If systems 9 contain a plurality of agents, the destination may be identified by a combination of a destination computer 9 ID or address and a destination agent ID.

If the name and the value of a preference parameter are received by the inter-agent communicator 920 through the communication IF 910, the communicator 920 passes the received data to the agent script processor 170, which in turn sets the preference parameter identified by the name for the value.

Communication among agents 9 has been described with reference to a preference parameter. However, agent characteristic script(s) may be communicated among agents 110a by providing each agent script base (not-shown) with an operation description for a command to send an agent characteristic script to a specified destination agent 110a and an operation description for setting a received agent characteristic script in a predetermined manner. The operation in this case is done in the same manner as in case of preference parameter communication.

It is seen from the above description that any agents 110a can set a preference parameter and/or a agent characteristic script thereof to any other agents 110a. This enables the agents 110a to cooperate with one another.

Embodiment III

Figure 10:
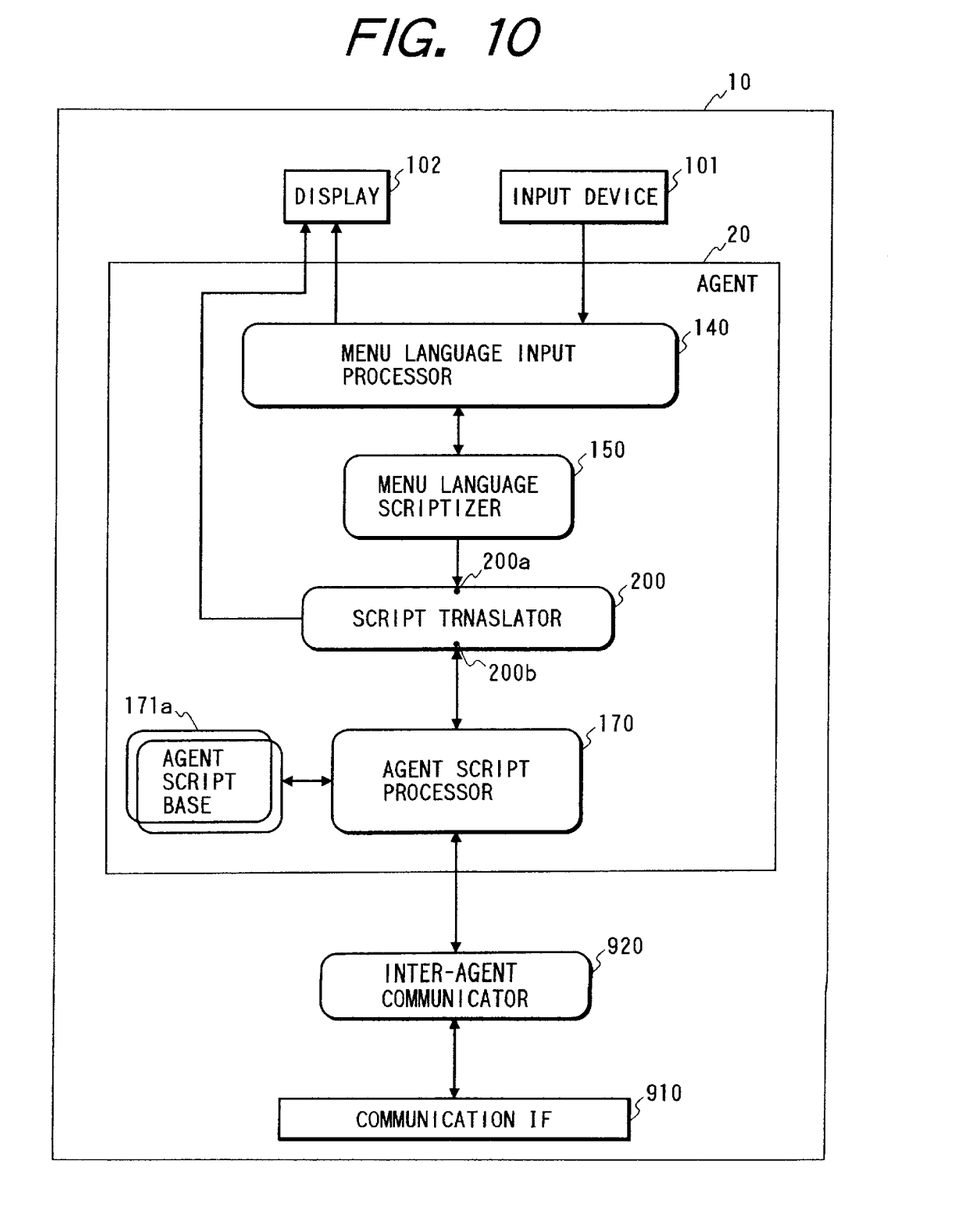
FIG. 10 is a schematic block diagram showing a computer-based system with a menu language input capability in accordance with the principles of the invention.

FIG. 10 is a schematic block diagram showing a computer-based system with a menu language input capability in accordance with the principles of the invention, wherein rectangular blocks indicate hardware, single-line corner-rounded blocks indicate software or programs, and double-line corner-rounded blocks indicate data sets. The computer-based system 10 is basically the same as that of FIG. 1 and only comprises the input device 101, the display 102, the communication IF 910, the menu language input processor 140, the menu language scriptizer 150, the agent script processor 170, an agent script base 171a, and a script translator 200.

It should be noted that in FIG. 10 the agent 20 is shown as in a translation mode. The agent 20 can also operate in a transparent mode in which the output of the menu language scriptizer 150 is passed directly to the agent script processor 170.

The agent script base 171a has the same function as that of the agent script base 171 of FIG. 1 and most of the contents of the script base 171a are common to the contents of the script base 171. However, the agent script base 171a contains operation descriptions associated with a translation command and a translation_&_transfer command.

Figure 11:
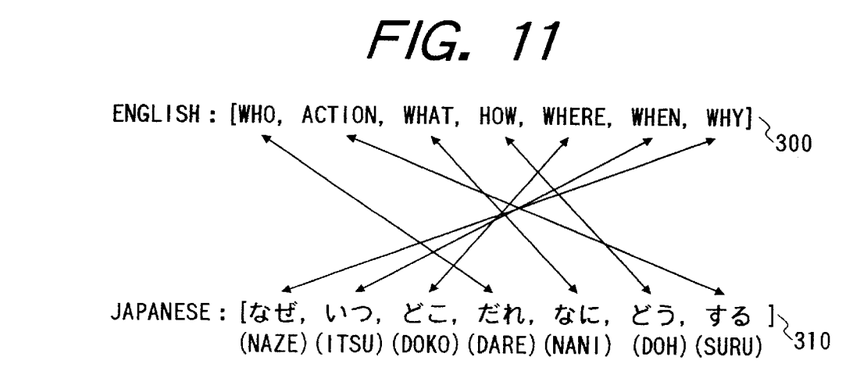
FIG. 11 is a diagram illustrating how the script translator 200 convert bidirectionally an input script in one language into a translated input script in other language.

FIG. 11 is a diagram illustrating how the script translator 200 converts bidirectionally an input script in one language into a translated input script in other language. It is assumed that the agent 20 is in the translation mode. In FIG. 11, if the translator 200 receives an input script [WHO, ACTION, WHAT, HOW, WHERE, WHEN, WHY] 300 in English from 200*a* (or 200*b*), then the translator 200 outputs a translated input script [なぜ(naze), いつ(itsu), どう(doko), だれ(dare), なに(nani), どう(doh), する(suru)] 310 in Japanese from 200*b* (or 200*a*).

An operation of sending a message to another agent 20 will be described in the following. If the user inputs the above-mentioned translate_&_transfer command to translate and send a message to a specified agent and further inputs a message "( , 今では, 大磯で, 私は, 古いサーファー, , です)", then the menu language scriptizer 150 outputs an input script "[ , 今では, 大磯で, 私は, 古いサーファー, , です]" (Absence of data indicates an input default for the menu item). Operating as shown in FIG. 11, the script translator 200 converts the input script into a translated input script "[ I, am, old surfer, , Oiso, now, why]". The translated input script is transmitted to the specified agent by the agent script processor 170 executing an operation description associated with the translate_&_transfer command.

In the specified agent, the received input script is passed to the script translator 200. If the user of the specified agent usually uses English, then the script translator 200 outputs the received script as it is, that is, as "I, am, old surfer, how, Oiso, now, why". If the user usually uses Japanese, then the script translator 200 translates the received script into a Japanese input script and outputs as "なぜ, 今では, 大磯で, 私は, 古いサーファー, どう, です".

As seen from the above description, the users can communicate with one another through the agents regardless of the languages used.

Many widely different embodiments of the present invention may be constructed without departing from the spirit and scope of the present invention. It should be understood that the present invention is not limited to the specific embodiments described in the specification, except as defined in the appended claims.

What is claimed is:

1. A software module in a computer-based system which module operates to meet a message from a user; the module comprising:

means for permitting the user to input said message such that said message is acceptable in the module;

means for converting said message into an input script in a predetermined form;

a plurality of operation descriptions, each of said operation descriptions comprising a conditional statement concerning said input script and at least one instruction which may be written by using at least one parameter and functions in various ways associated with possible values of each of said at least one parameter;

setting means for setting parameters which are to be used by one of said operation descriptions whose conditional statement is satisfied by said input script for values associated with a selected one of characteristic types prepared for the module;

means activated after said setting for executing said at least one instruction of one of said operation descriptions whose conditional statement is satisfied by said input script;

sending means responsive to a passed data for sending said passed data to another agent; and receiving means responsive to a received data from another agent for passing said received data to said means for executing said at least one instruction, wherein said plurality of operation descriptions include:

an operation description which is used for a parameter sending command and which passes an ID and a value of a parameter specified by the user and a destination agent address to said sending means; and an operation description which is used for a parameter receiving command and which sets a parameter of an ID contained in said received data for a value contained in said received data.

2. A software module in a computer-based system which module operates to meet a message from a user; the module comprising:

means for permitting the user to input said message such that said message is acceptable in the module;

means for converting said message into an input script in a predetermined form;

a plurality of operation descriptions, each of said operation descriptions comprising a conditional statement concerning said input script and at least one instruction which may be written by using at least one parameter and functions in various ways associated with possible values of each of said at least one parameter;

setting means for setting parameters which are to be used by one of said operation descriptions whose conditional statement is satisfied by said input script for values associated with a selected one of characteristic types prepared for the module;

means activated after said setting for executing said at least one instruction of one of said operation descriptions whose conditional statement is satisfied by said input script;

sending means responsive to a passed data for sending said passed data to another agent; and receiving means responsive to a received data from another agent for passing said received data to said means for executing said at least one instruction, wherein said plurality of operation descriptions include:

an operation description which is used for a characteristic script sending command and which passes a characteristic script to said sending means; and an operation description which is used for a characteristic script receiving command and which sets, as said selected characteristic type, a characteristic script contained in said received data.

\* \* \* \* \*